US010790994B2

(12) United States Patent
Cambou et al.

(10) Patent No.: US 10,790,994 B2
(45) Date of Patent: Sep. 29, 2020

(54) NANOMATERIAL PHYSICALLY UNCLONABLE FUNCTION SYSTEMS AND RELATED METHODS

(71) Applicant: Arizona Board of Regents for Northern Arizona Univ, Flagstaff, AZ (US)

(72) Inventors: Bertrand Cambou, Flagstaff, AZ (US); John Gibbs, Flagstaff, AZ (US)

(73) Assignee: Arizona Board of Regents acting for and on behalf of Northern Arizona University, Flagstaff, AZ (US)

( * ) Notice: Subject to any disclaimer, the term of this patent is extended or adjusted under 35 U.S.C. 154(b) by 699 days.

(21) Appl. No.: 15/344,499

(22) Filed: Nov. 4, 2016

(65) Prior Publication Data

US 2017/0134174 A1 May 11, 2017

Related U.S. Application Data

(60) Provisional application No. 62/251,518, filed on Nov. 5, 2015.

(51) Int. Cl.
*H04L 9/32* (2006.01)
*G09C 1/00* (2006.01)
(Continued)

(52) U.S. Cl.
CPC ............ *H04L 9/3271* (2013.01); *G02B 1/002* (2013.01); *G02B 5/201* (2013.01); *G02B 6/4215* (2013.01);
(Continued)

(58) Field of Classification Search
CPC ....... H04L 9/3271; H04L 9/3278; G09C 1/00; G02B 5/201; G02B 6/4215; G02B 1/002; B82Y 10/00; B82Y 20/00; Y10S 977/834
See application file for complete search history.

(56) References Cited

U.S. PATENT DOCUMENTS 5,434,917 A 7/1995 Naccache et al.
5,864,625 A 1/1999 Rutledge
(Continued)

OTHER PUBLICATIONS

K. Robbie and M. Brett, "Sculptured thin films and glancing angle deposition: Growth mechanics and applications," J. Vac. Sci. Technol. A 15, 1460 (1997).
(Continued)

*Primary Examiner* — Mohammed Waliullah
(74) *Attorney, Agent, or Firm* — Adam R. Stephenson, Ltd.

(57) ABSTRACT

Implementations of light filters for use in cryptographic operations may include: a substrate having at least a first side and a second side, the first side opposing the second side, the substrate including one of a translucent, a transparent, and a semi-transparent material, and any combination thereof; and one or more layers of microscopic structures coupled to one of the first side, the second side, and both the first side and the second side of the substrate, the microscopic structures each containing one or more structural elements configured to interact with light. The microscopic structures may be configured to collectively form a unique light pattern on a detector optically coupled with the light filter. The unique pattern may be configured to be used to form a challenge-response pair (CRP) and the CRP is configured to be used in cryptographic operations to authenticate an electronic device associated with the light filter.

12 Claims, 7 Drawing Sheets

(51) Int. Cl.
*G02B 1/00* (2006.01)
*G02B 5/20* (2006.01)
*G02B 6/42* (2006.01)
*B82Y 10/00* (2011.01)
*B82Y 20/00* (2011.01)

(52) U.S. Cl.
CPC .............. *G09C 1/00* (2013.01); *H04L 9/3278* (2013.01); *B82Y 10/00* (2013.01); *B82Y 20/00* (2013.01); *Y10S 977/834* (2013.01)

(56) References Cited

U.S. PATENT DOCUMENTS

| | | | | |
|---|---|---|---|---|
| 2004/0170016 | A1* | 9/2004 | Pellegrino | G06F 11/324 362/231 |
| 2007/0113268 | A1 | 3/2007 | Murphy et al. | |
| 2007/0090312 | A1* | 4/2007 | Stallinga | G02B 27/48 250/580 |
| 2008/0112596 | A1 | 5/2008 | Rhoads et al. | |
| 2009/0132624 | A1* | 5/2009 | Haselsteiner | G06F 7/588 708/255 |
| 2009/0240945 | A1 | 9/2009 | Aronson | |
| 2014/0189374 | A1 | 7/2014 | Meyer | |

OTHER PUBLICATIONS

Y.-P. Zhao, et al., "Novel Nano-Column and Nano-Flower Arrays by Glancing Angle Deposition," Nano Lett. 2 (4), 351-354 (2002).
J. Gibbs et al., "Plasmonic nanohelix metamaterials with tailorable giant circular dichroism," Applied Physics Letters 103, 213101 (2013).
A. G. Mark, et al., "Hybrid nanocolloids with programmed three-dimensional shape and material composition," Nature Materials 12, 802-807 (2013).
Eslami, S., et al., "Chiral Nanomagnets," ACS Photonics, 1(11), 1231-36 (2014).
J. G. Gibbs, et al., "Nanohelices by shadow growth," Nanoscale 6, 9457-66 (2014).
J. Homola, et al., "Surface plasmon resonance sensors: review." Sensors and Actuators B: Chemical 54, 3-15 (1999).
C. Sönnichsen and A. P. Alivisatos, "Gold Nanorods as Novel Nonbleaching Plasmon-Based Orientation Sensors for Solarized Single-Particle Microscopy," Nano Lett. 5(2), 301-304 (2005).
K.-S. Lee and M. A. El-Sayed, "Gold and Silver Nanoparticles in Sensing and Imaging: Sensitivity of Plasmon Response to Size, Shape, and Metal Composition," J. Phys. Chem. B 110(39), 19220-25 (2006).
K. A. Willets and R. P. Van Duyne, "Localized Surface Plasmon Resonance Spectroscopy and Sensing," Rev. Phys. Chem. 58, 267-97 (2007).
J. N. Anker, et al., "Biosensing with plasmonic nanosensors," Nature Materials 7, 442-53 (2008).
P. K. Jain, et al., "On the Universal Scaling Behavior of the Distance Decay of Plasmon Coupling in Metal Nanoparticle Pairs: A Plasmon Ruler Equation," Nano Lett. 7(7), 2080-88 (2007).
Pravin Prabhu et al., "Extracting Device Fingerprints from Flash Memory by Exploiting Physical Variations," Proceedings of the 4th International Conference on Trust and Trustworthy Computing (Trust 2011), Jun. 22-24, 2011, Pittsburgh, PA, available online at https://cseweb.ucsd.edu/~swanson/papers/TRUST2011FPUFs.pdf, last accessed Sep. 8, 2016.
Dai Yamamoto et al., "Uniqueness Enhancement of PUF Responses Based on the Locations of Random Outputting RS Latches," Proceedings of the Workshop on Cryptographic Hardware and Embedded Systems 2011 (CHES 2011), Lecture Notes in Computer Science (LNCS) vol. 6917, pp. 390-406, 2011.

* cited by examiner

NANOMATERIAL PHYSICALLY UNCLONABLE FUNCTION SYSTEMS AND RELATED METHODS

CROSS REFERENCE TO RELATED APPLICATIONS

This document claims the benefit of the filing date of U.S. Provisional Patent Application 62/251,518, entitled "Nanomaterial Physically Unclonable Function Systems and Related Methods" to Bertrand Cambou and John Gibbs which was filed on Nov. 5, 2015 the disclosure of which is hereby incorporated entirely herein by reference.

BACKGROUND

1. Technical Field

Aspects of this document relate generally to cryptographic operations. The cryptographic operations include generating physical unclonable functions (PUFs), challenge response pairs and random numbers for use in telecommunication network security. More specific implementations involve systems used for constructing optical firewall systems.

2. Background

Conventionally, to provide security for telecommunication systems various codes or coding systems are used. These systems employ various cryptographic operations, which often involve applying various algorithms to encode data being transmitted across the telecommunication system using random numbers. In other systems, verification of each portion of the system is done using a private/public key pair.

SUMMARY

Implementations of light filters for use in cryptographic operations may include: a substrate having at least a first side and a second side, the first side opposing the second side, the substrate including one of a translucent, a transparent, and a semi-transparent material, and any combination thereof; and one or more layers of microscopic structures coupled to one of the first side, the second side, and both the first side and the second side of the substrate, the microscopic structures each containing one or more structural elements configured to interact with light. The microscopic structures may be configured to collectively form a unique light pattern on a detector optically coupled with the light filter. The unique pattern may be configured to be used to form a challenge-response pair (CRP) and the CRP is configured to be used in cryptographic operations to authenticate an electronic device associated with the light filter.

Implementations of light filters may include one, all, or any of the following:

The microscopic structures may be formed by one of subtractive material processing techniques and additive material processing techniques.

The microscopic structures may be configured to interact with one of coherent light, polarized light, diffuse light, and any combination thereof.

The electronic device associated with the light filter may be electrically coupled with a telecommunication channel and the light filter is used to authenticate the electronic device over the telecommunication channel.

The light filter may be optically coupled with a fiber optic cable.

The unique pattern may be used to generate a physically unclonable function (PUF) using identified intensities of light by: encoding very light intensities as 0, encoding very dark intensities as 1, and encoding intensities between the very light and the very dark as X; using the 0 and 1 values to generate a challenge of the CRP; using the 0, 1 values and the X values to generate a response of the CRP.

Implementations of light filters for use in cryptographic operations may include: a substrate having a first side opposite a second side, the substrate formed of one of a transparent material, a translucent material, a semitransparent material, and any combination thereof; and a coating of microscopic structures on one of the first side, the second side, and both the first side and the second side of the substrate. The substrate may be configured to receive light on the first side, pass the light through the second, thereby forming a unique pattern on a detector optically coupled with the light filter, where the unique pattern is generated by the light interacting with the coating of microscopic structures. The unique pattern may be configured to be used in cryptographic operations.

Implementations of light filters for use in cryptographic operations may include one, all, or any of the following:

The microscopic structures may be formed by one of subtractive material processing techniques and additive material processing techniques.

The light may be one of coherent light, polarized light, diffuse light, and any combination thereof.

The unique pattern may be used to generated a physically unclonable function (PUF) using identified intensities of light by: encoding very light intensities as 0, encoding very dark intensities as 1, and encoding intensities between the very light and the very dark as X; using the 0 and 1 values to generate a challenge of the CRP; using the 0, 1 values and the X values to generate a response of the CRP.

The cryptographic operations may include forming a challenge-response pair (CRP) and the CRP may be configured to be used to authenticate an electronic device.

The cryptographic operations may include generating random numbers to be used in encoding data transmitted between devices.

Implementations of a method of generating a challenge-response pair using a light filter for use in cryptographic operations may include: providing a light filter, where the light filter may include one of a translucent, a transparent, a semitransparent, and any combination thereof substrate coupled with a layer of microscopic structures. The method may further include passing light through the light filter; receiving light from the light filter on a detector to form a pattern using the detector, the pattern including at least three identified intensities of light; encoding the pattern including the at least three identified intensities of light using 0, 1, and X to represent the at least three identified intensities of light, to form an encoded pattern; and using the encoded pattern in cryptographic operations.

Implementations of the method of generating a challenge-response pair using a light filter for use in cryptographic operations, may include one, all, or any of the following:

The microscopic structures may be one of substantively formed and negatively formed.

The light passing through the light filter may be one of coherent light, polarized light, diffuse light, and any combination thereof.

The light filter may be operatively coupled with a fiber optic cable.

The electronic device associated with the light filter may be electrically coupled with a telecommunication channel and the light filter may be used to authenticate the electronic device over the telecommunication channel.

Using the encoded pattern in cryptographic operations may further include generating a challenge response pair (CRP), the method may further include: extracting the pattern of identified intensities of light from the detector; encoding challenges by blanking Xs and differentiating 0s and 1s; encoding responses by reading only the 0s and the 1s; storing the challenges in a secured server, the challenges to be retrieved when an outside system provides a response; wherein one or more CRP errors are minimized by eliminating the Xs.

Using the encoded pattern in cryptographic operations may further include generating a challenge response pair (CRP), the method may further include: extracting the pattern of identified intensities of light from the detector; encoding challenges by blanking Xs and differentiating 0s and 1s; encoding responses by reading only Xs; storing the challenges in a secured server, the challenges to be retrieved when an outside system provides a response.

Using the encoded pattern in cryptographic operations may further include generating a challenge response pair (CRP), the method may further include: segmenting further each of the identified intensities of light encoded as X into at least two groups, encoded as 0 and 1, representing bright light intensities and dark light intensities respectively; extracting the encoded 0s and encoded 1s in a random order to generate numbers; and storing the random numbers in a secured server.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended light filters for use in cryptographic operations will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such light filters for use in cryptographic operations and implementing components and methods, consistent with the intended operation and methods.

Figure 1:
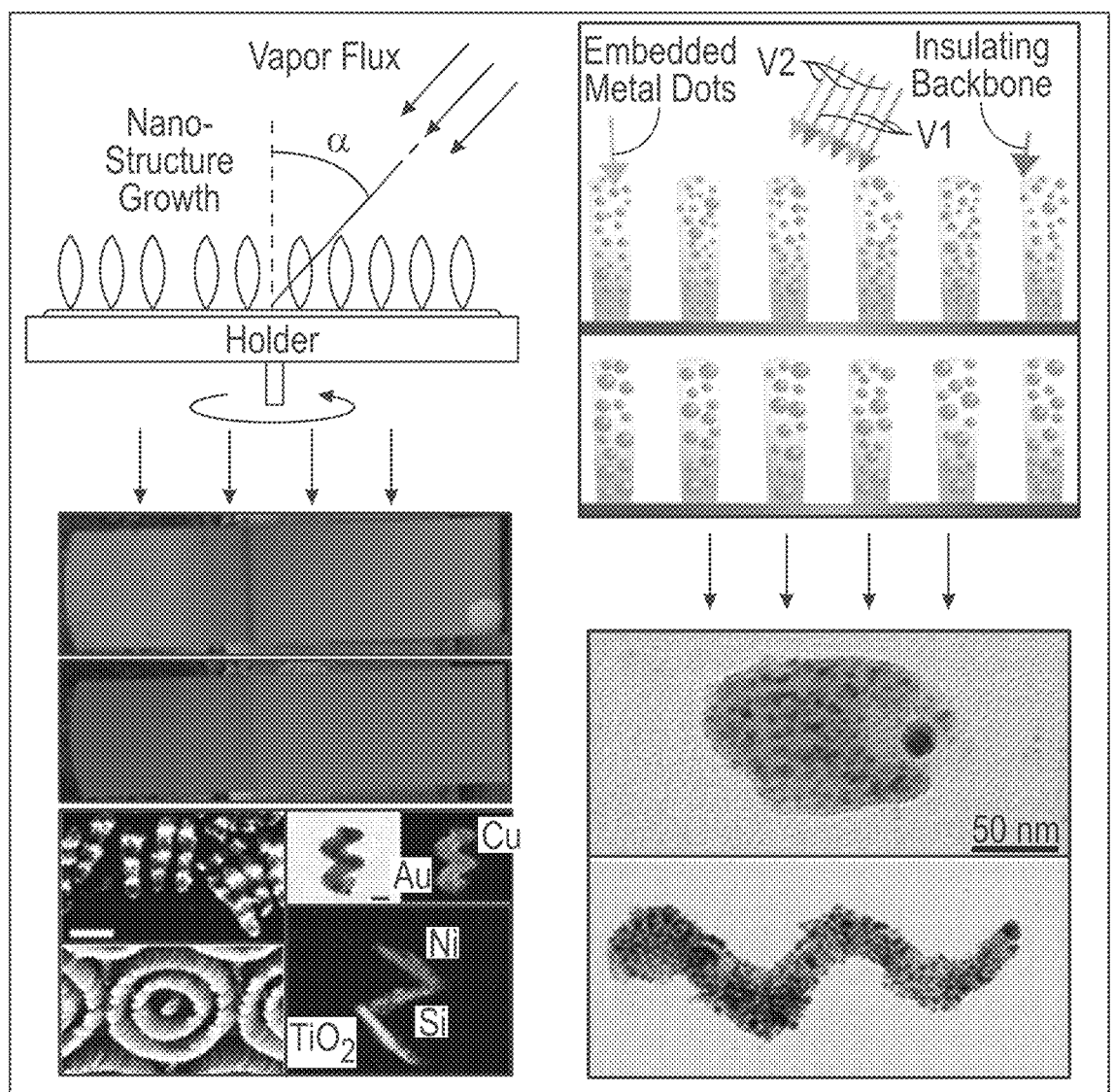
FIG. 1 is a schematic of the formation and structures of microscopic structures used in implementations of light filters.

Referring to FIG. 1, examples of nanostructures (microscopic structures) are illustrated. Such microscopic structures may be formed using a variety of methods and techniques. For example, nanostructures can be formed through subtractive material processing techniques, through additive material processing techniques, a combination thereof or any suitable method known in the art. In various implementations, subtractive material processing of nanostructures includes etching a portion of a material or a substrate away. In other implementations, nanostructures can also be additively formed by depositing additional material to an underlying substrate. The deposition may be carried out using various techniques, including angled vapor flux deposition during rotation of the substrate to which the microscopic structures are affixed. Various combinations of these techniques may also be used to form the microscopic structures as will be described more fully below.

Various implementations of microscopic structures described herein may be used in implementations of light filters for use in cryptographic operations. Implementations of light filters may include a substrate having at least a first side and a second side. The first side of the substrate opposes the second side of the substrate. In various implementations, the substrate may be a translucent material, a transparent material, a semi-transparent material, any combination thereof or any suitable material known in the art. By non-limiting example the substrate may be glass or a similar material in particular implementations. One or more layers of microscopic structures as described herein may be coupled/formed on the first side of the substrate. In other implementations, the microscopic structures may be coupled/formed on the second side of the substrate or the microscopic structures may be coupled/formed on both the first side and the second side of the substrate. In various implementations the microscopic structures may be a coating on the substrate. The microscopic structures may be configured to collectively form a unique light pattern on a detector optically coupled with the light filter. Implementations of the detectors will be described more fully below. In various implementations, the unique light patterns formed by the microscopic structures may be used to form physically unclonable functions (PUFs), challenge response pairs (CRPs), random numbers, cryptographic keys for authentication systems, and other number systems, patterns, or codes that can be used in cryptographic operations.

PUFs are functions created using unique attributes and characteristics of a device or system that are then subsequently used in an authentication or encryption/decryption process. The most powerful PUFs are generated using attributes and characteristics of the system that vary naturally and differ from one device or system to another, such as the microscopic structures described herein. PUFs may be used to generate challenge-response pairs (CRPs). The PUF functions which vary according to ordinary manufacturing variations of the device or system allow a large number of challenge (input) response (output) pairs that are unique to the device or system. To be useful, the CRPs need to be reproducible, predictable, and easy to compare/recognize during the authentication process. As will be described in more detail herein, the challenges may be stored in a secure server. During an authentication cycle, the PUF generated response for a particular device/system is compared to the challenge in the secure server. Authentication is granted when the rate of matching of the challenge and response pair is statistically high enough to ensure the desired level of security. Weak PUFs produce a satisfactory rate of matching of challenge response pairs far from 100%. Strong PUFs produce a rate close to 100%. Besides the rate of matching, other criteria used to assess the quality of a PUF include the size of the CRPs and the robustness of the responses with respect to variations in temperature, voltage, electromagnetic interference, aging, and other environmental and operating factors and parameters. Strong PUFs exhibit a randomness and uniqueness that contribute to them being both hard to extract and identify for unwelcome users while being easy to use in authentication and cryptographic processes.

Additional disclosure regarding the structure, creation, and use of PUFs may be found in U.S. Provisional Patent Application Ser. No. 62/204,912, filed Aug. 13, 2015, to Bertrand Cambou, entitled "Physically Unclonable Function Generating Systems and Related Methods," the disclosure of which is hereby incorporated entirely herein by reference; and the U.S. Utility application Ser. No. 14/958,436, filed Dec. 3, 2015 to Bertrand Cambou, entitled "Physically Unclonable Function Generating Systems and Related Methods," the disclosure of which is incorporated entirely herein by reference.

Typical approaches for securing telecommunication channels may be found in the following references, the disclosures of each of which are hereby incorporated entirely herein by reference: U.S. Pat. No. 5,864,625 to Christopher Rutledge, entitled "Methods and apparatus for secure optical communications links," issued Jan. 26, 1999; U.S. Patent Application Publication No. 20070113268 to Murphy et al., entitled "Intrusion resistant passive fiber optic components," filed Aug. 1, 2006; U.S. Patent Application Publication No. 20090240945 to Lewis Aronson, entitled "Anticounterfeiting means for optical communication components," filed Nov. 3, 2008; and U.S. Patent Application Publication No. 20140189374 to Bernd Meyer, entitled "System and method for the secure transmission of data," filed Aug. 1, 2012. Conventional approaches have typically focused on capturing changes in the signal resulting from handling of the fiber or encrypting the optical signal being carried by the optical fiber.

In a system implementation, a light filter for use in cryptographic operations as described herein may associated with an electronic device. The unique pattern of the light filter may be configured to form a CRP and the CRP may be configured to be used in cryptographic operations to authenticate the electronic device. In various implementations, the electronic device associated with the light filter may be electrically coupled with a telecommunication channel and the light filter may be used to authenticate the electronic device over the telecommunication channel. In other implementations, the light filter may be optically coupled with a fiber optic cable. The fiber optic cable may provide a light that passes from the first side of the substrate to the second side of the substrate, thereby forming a unique pattern on a detector optically coupled with the light filter. In various implementations, the unique light pattern may be generated by the light interacting with the microscopic structures. In particular implementations, the microscopic structures may be a coating on the first side, the second side or both the first side and the second side of the substrate. In various other implementations, the light interacting with the light filter may include coherent light, polarized light, diffused light, and any combination thereof.

Figure 3:
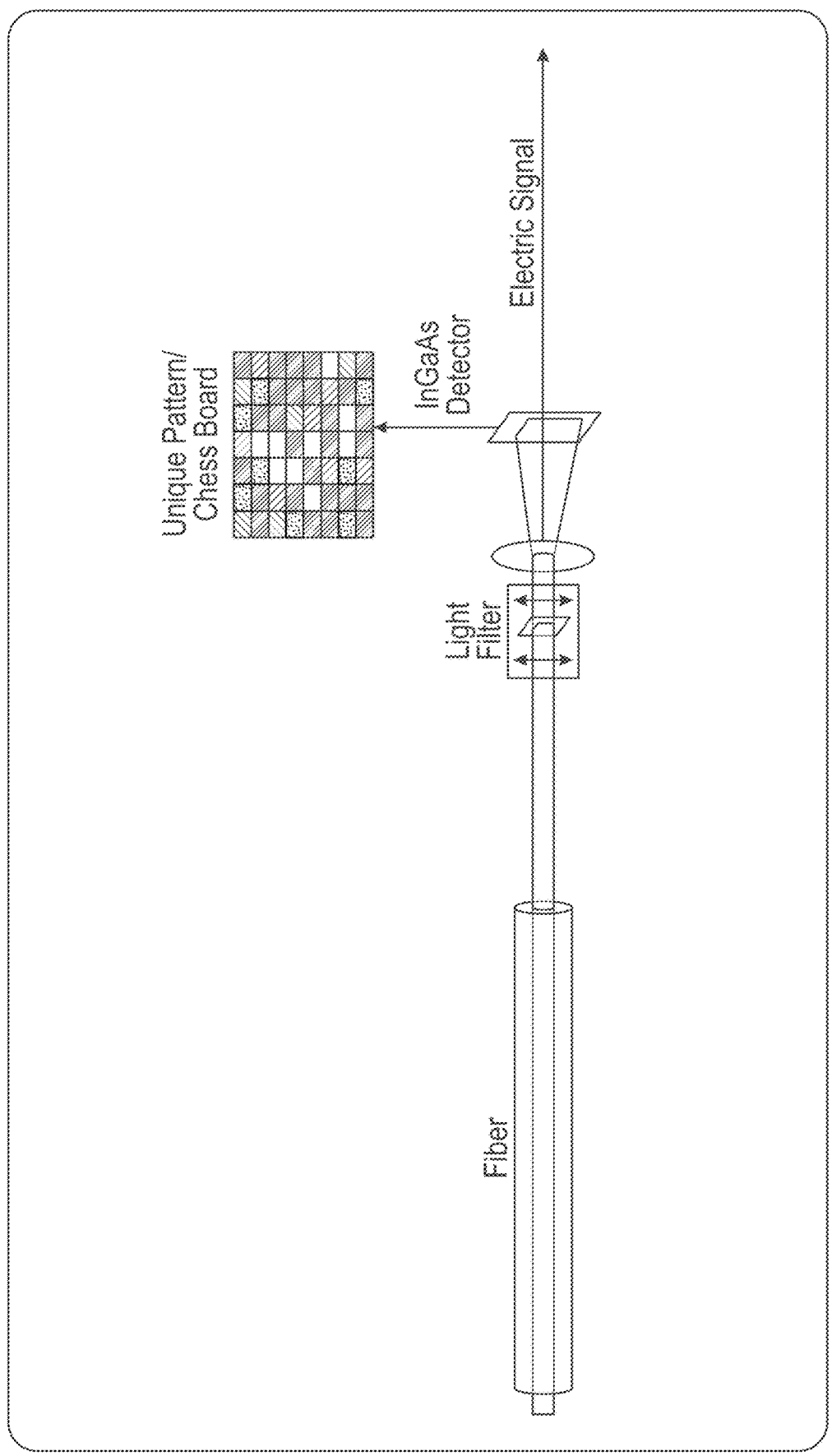
FIG. 3 is a schematic of an implementation of a light filter used in a telecommunication channel.

The detector may observe the light that has passed through the light filter creating a unique pattern. The light filter may contain microscopic structures and/or nanostructures that vary in sizes and locations and therefore interact with the light passing through the light filter, creating an optically altered light/unique pattern which differs from the original light and affects what is observed by the detector. The unique pattern may be configured to be used in cryptographic operations in various implementations. The unique pattern may be made up of pixels, it may resemble a checkerboard, or it may be divided up or analyzed in any suitable manner known in the art. In various implementations, the detector includes a plurality of pixel elements designed to receive light and output an electrical signal based on characteristics of that the received light (FIG. 3). Particular detectors may receive the unique pattern of light and create a grayscale image where the intensity/shade of each grayscale pixel in the image is a function of the degree of alteration of the original light as it passed through the light filter. In other implementations, grayscale images may not be used, but, by non-limiting example, color images, light intensity maps, light frequency shifting maps, frequency modulation maps, light amplitude mapping, light refraction mapping, angle of incidence of the light on the detector mapping, light polarization mapping, or detecting/mapping of any other light characteristic affected by the microstructures included in the light filter may be employed in various implementations.

In various other implementations, the unique pattern may be a greyscale image. With the grayscale image (or other map), the image/map may be analyzed and one of three states may be assigned to each portion (pixel in some implementations) of the image and stored in a memory associated with the detector, a 0 for very light areas/intensities, a 1 for very dark areas/intensities, and an X for all areas/intensities between the very light and very dark areas/intensities. The resulting stored values in the memory are then used by the system to generate a PUF. In some implementations, just the 0s and 1s will be used to generate the PUF challenge; in others, some or all of the Xs may also be used to generate the PUF challenge. Once the PUF challenge has been generated, it is stored in a memory associated with the system, which may be a secure server, cryptoprocessor, or other secure element coupled via a telecommunication channel in particular implementations. The data included in the PUF challenge may be stored and/or transmitted as a ternary stream of data or a binary stream of data.

A wide variety of microstructures, nanomaterials, nanostructures, and methods of generating a PUF may be used in various system implementations. Those disclosed in this document are merely for the exemplary purposes of this disclosure.

Figure 2:
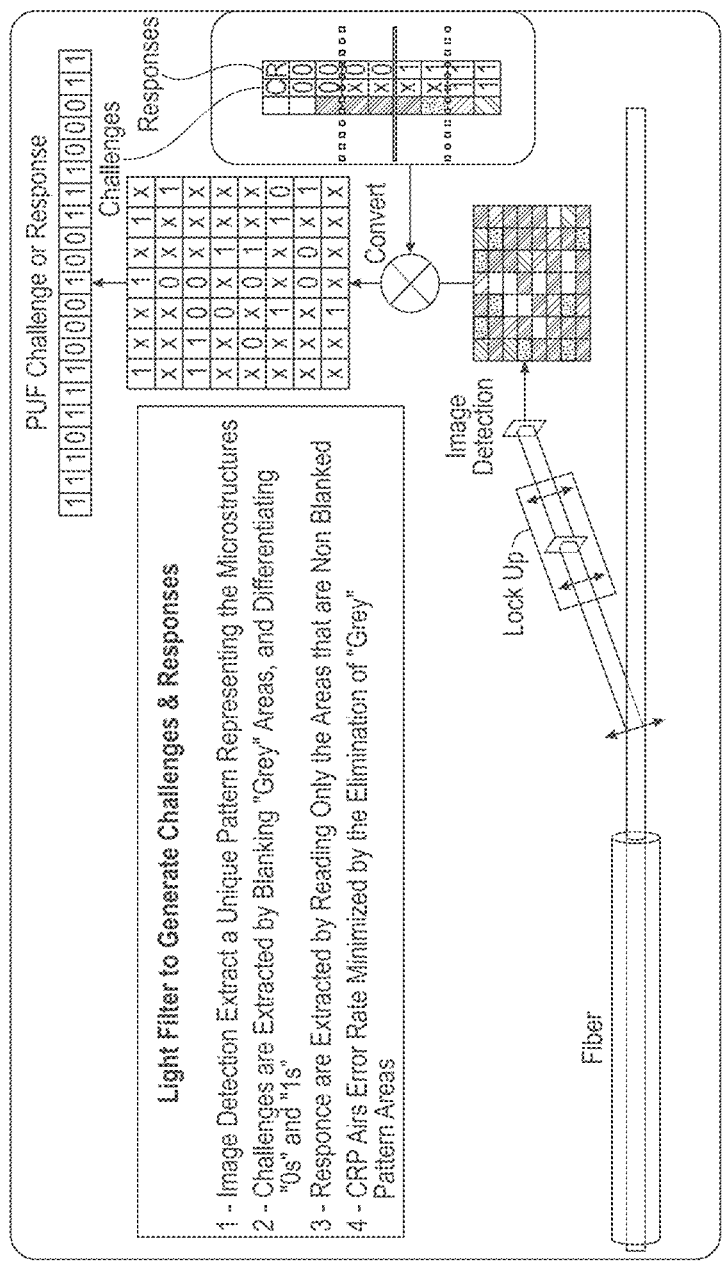
FIG. 2 is a schematic of a method of generating physically unclonable functions (PUF) using light filters according to this disclosure.

Referring to FIG. 2, an implementation of a cryptographic system using a light filter is disclosed. In this implementation, a beam splitter or other structure for separating a portion of the light passing through an optical fiber is used to send a portion of the light through a light filter (in the Lock Up section) and then on to a detector. In various implementations, the detectors may be an image detector. The use of a beam splitting structure allows the use of the system both at the terminus of the fiber or at any other point along the fiber, depending upon the particular needs of the system. As illustrated, the detector receives the optically altered light signal and creates a unique pattern, which is then encoded based on the identified intensities of light in the unique pattern. The unique pattern may include pixels, sections (the chess board), or portions of the unique pattern. As can be seen in FIG. 2, threshold values of light and dark intensities (represented by dotted lines) may be identified in various implementations to separate the values of the unique pattern into three regions, a first region outside one threshold for light values/intensities assigned a 0, a second region inside the thresholds assigned an X value, and a third region outside the other threshold assigned a 1 value. These values are then mapped into a memory, and the values of 1s and 0s read out to form a PUF challenge or response. As can be seen in FIG. 2, in some implementations, the PUF challenge may include only the 1s and 0s. In some implementations, the paired corresponding PUF response may include 1s and 0s assigned to grayscale regions within but on either side of a dividing threshold between lighter and darker regions. This results in the PUF response potentially having more bits than the corresponding PUF challenge. In other implementations, the paired corresponding PUF response may have only the 1s and 0s. In various implementations, the identified intensities may be predetermined and preprogrammed into the system. In other implementations, the identified intensities may be chosen after the light pattern is formed.

In various implementations, where the size of the fiber in the fiber optic cable is 50 microns in diameter $d_c$, and the size of the light filter is 100 nm wide $n_h$, the light filter can potentially contain a very large number of microstructures structures as given by $\pi/4$ ($d_c^2/n_h^2$) or approximately 200,000 structures. For smaller cables, such as those 8 microns in diameter, approximately 5000 microstructures structures could be included on a light filter. Given that solid PUFs typically need about 128 bits to function, even this smaller quantity of microstructures would appear sufficient to be used in a PUF application. The cladding material around the fiber optic fiber itself, typically 125 microns in diameter may also be used to increase the amount of the microstructures available for PUF creation.

In various system implementations, the detector may be a complementary metal oxide semiconductor (CMOS) image sensor with a pixel size in the about 1.7 micron by about 1.7 micron range where the light in the cable includes light in the about 800 nm to about 900 nm wavelength range. For such a sensor, about 650 pixels can observe a 50 micron diameter optical fiber. Other image detector types may be employed depending on the light wavelengths employed. In various implementations, commercial fiber optic communications use deep infrared wavelengths between about 800 nm and about 1700 nm outside the visible spectrum. The particular microstructures effective to alter the light to create a level of gray distribution/desired optical characteristic map can be chosen depending on the light wavelength used, may be visible spectrum light or invisible spectrum light, including ultraviolet and infrared light capable of being carried by an optical fiber.

In some implementations, the light beam size coming from the optical fiber may be expanded using a lens between the light filter and the detector as illustrated in FIG. 3. Such implementations may allow the use of an InGaAs image sensor. Currently available sensors have pixel sizes of about 15 microns by about 15 microns allowing about 1000 pixels to fit in a footprint of 0.5 mm by 0.5 mm. Charge coupled devices (CCDs) may also be used as detectors in various implementations.

In FIG. 3 it is noted that no beam splitter system is used, but the entire light signal in the optical fiber is passed through the light filter before being received by the detector (direct conversion system). More complex single/multiple detector systems could and likely would be used in various implementations where the detector is both the image sensor for PUF generation and the sensor converting the light in the cable into an electronic signal.

In the various system examples, the surrounding circuitry around the system is not disclosed in detail herein but any circuitry capable of handling/processing ternary state memory data could be used. In various implementations, the PUF challenge/response generating cycle could be done concurrently with the data transmission or sequentially. A negative authentication cycle may be used that triggers a disruption of the transmission of the communication, or may not disrupt the transmission. Any memory capable of handling ternary state information could be used provided it can also be used to blank marginal areas in the memory. Examples of such memories and devices may be found in U.S. Pat. No. 5,434,917 to Naccache et al., entitled "Unforgeable identification device, identification device reader, and method of identification," issued Jul. 18, 1995; Pravin Prabhu et al.; June 2011; Extracting Device Fingerprints from Flash Memory by Exploiting Physical Variations; 4*th international conference on Trust and trustworthy computing*; and Dai Yamamoto, and all; Uniqueness Enhancement of PUF Responses Based on the Locations of Random Outputting RS Latches; *CHES* 2011—*Lecture Notes in Computer Science Volume* 6917, 2011, pp 390-406; the disclosures of each of which are hereby incorporated entirely herein by reference.

Figure 4:
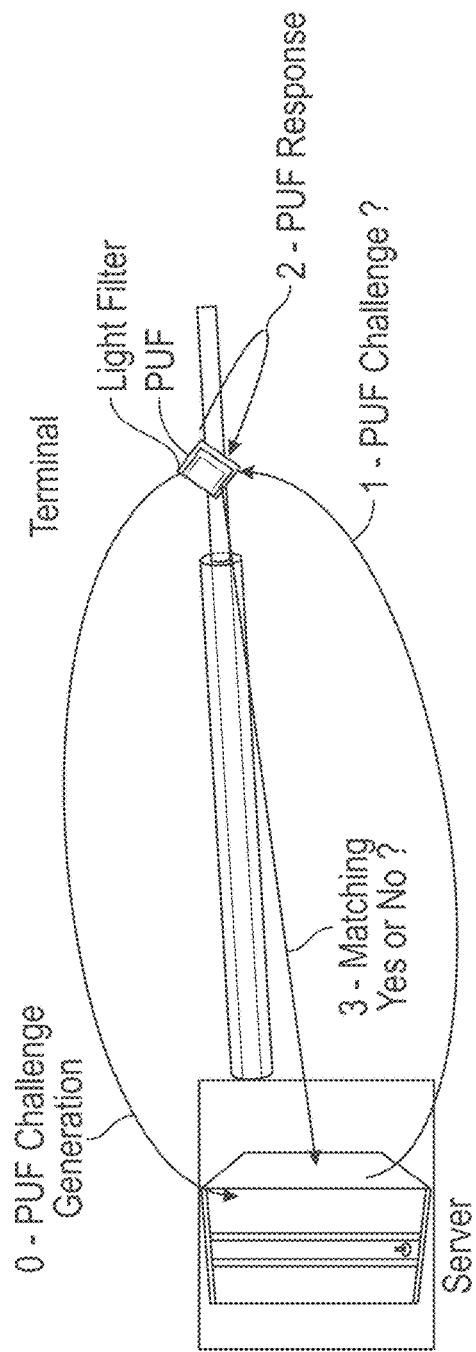
FIG. 4 is a schematic of an implementation of a light filter used a system implementation designed to interact with a secure server.

Implementations of light filters for use in cryptographic operations disclosed herein may utilize various methods of generating PUF CRPs and methods of authenticating using PUF CRPs. Referring to FIG. 4, a diagram of a method of using a PUF CRP for authenticating an optical communication system using fiber optic cable is illustrated. The method includes providing a light filter having a substrate coupled with a layer of microscopic structures. The substrate may include a material that is translucent, transparent, semitransparent, and any combinations thereof. Light is passed through the light filter and received on a detector forming a pattern. In various implementations, the patterns may include at least three identified intensities of light. The pattern may then be encoded using the at least three identified intensities of light to form an encoded pattern. The at least three intensities of light may be encoded using 0, 1, and X to each represent the at least three identified intensities as previously described. By non-limiting example, the encoded pattern may be used in cryptographic operations.

Implementations of the method may be used in a telecommunication channel to authenticate an electronic device over the telecommunication channel. As illustrated, the initial step involves first using a light filter to generate a reference challenge and forwarding it to the server. Any of the system/method implementations disclosed herein could be used to accomplish this. The secure server then sends a received PUF challenge from a system attempting to authenticate or the server itself to the light filter for use in cryptographic operations for generation of a PUF response. The server then evaluates whether the challenge and response pair match. If they do, then positive authentication is sent/granted/acknowledge according to the needs of the system. If not, negative authentication methods/procedures are triggered.

In various method implementations, the initial PUF challenge generation may be redone on demand as fresh data is needed or on a predetermined interval. On system power up or when a challenge is sent, the light filter for use in cryptographic operations may be used to generate PUFs and generate responses using the PUFs as often as needed. In various implementations, system security may be enhanced by doing CRP matching at the PUF level or by an electronic system controlling the PUF locally. It may not be desirable to transmit untested CRP responses back to the secure serve to avoid eavesdropping. A large rate of CRP errors due to the physical instability of the PUFs will result in doubts during authentication cycles. Accordingly, an important characteristic of the PUFs created is their ability to produce responses that are predictable and always similar to the initial challenges that were generated initially and stored in the server.

The encoded patterns in cryptographic operations may further be used to generate random numbers using identified intensities of light encoded as X. The method may include further segmenting each of the identified intensities of light encoded as X into at least two groups, encoded as 0 and 1, representing bright light intensities and dark light intensities respectively. The encoded 0s and the encoded 1s may be extracted in a random order to generate random numbers. The random numbers may then be stored in a secure server for future use.

Additional examples of various methods of generating random numbers using PUFs that could be used in systems employing light filters coated with microscopic structures like those disclosed herein can be found in U.S. Utility application Ser. No. 15/150,179, filed May 9, 2016 to Bertrand Cambou, entitled "Random Number Generating Systems and Related Methods," the disclosure which is hereby incorporated entirely herein by reference. In such implementations, the methods use the data created by the light filter rather than using data from a memory associated with the system. In such implementations, for example, the method for generating random numbers for use in cryptographic operations may involve segmenting each of the identified intensities of light encoded as X into at least two groups, encoded as 0 and 1, representing bright light intensities and dark light intensities respectively and extracting the encoded 0s and encoded 1s in a random order to generate numbers. The random numbers are then stored in a secured server, and/or, in various implementations, used directly to encode data to be sent into a telecommunication channel.

Figure 5:
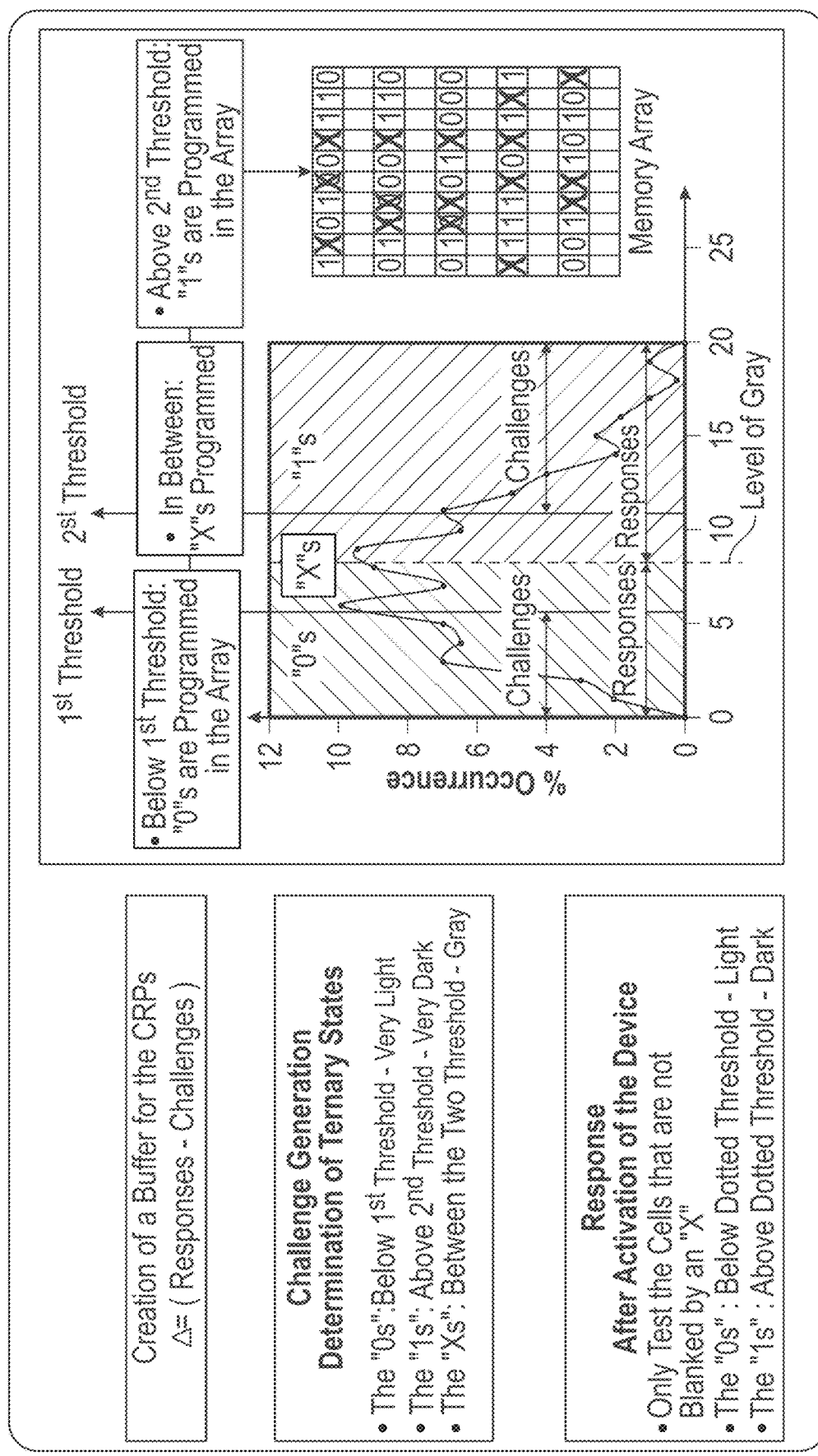
FIG. 5 is a schematic of an implementation of a method using a light filter to generate challenge-response pairs (CRPs) according to this disclosure.
Figure 6:
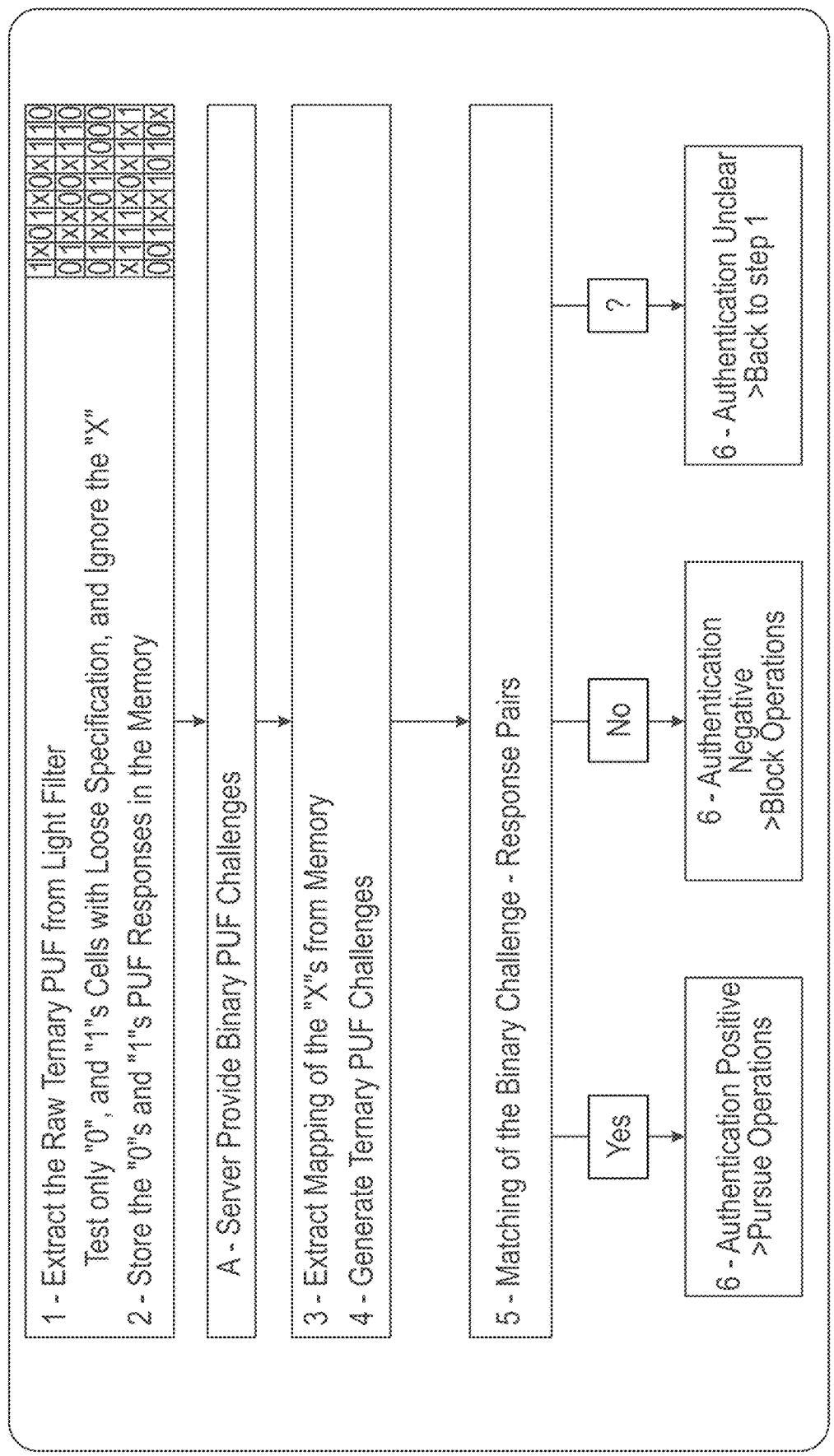
FIG. 6 is a flow chart of an implementation of a method of using a light filter to secure a telecommunication network.

FIG. 5 outlines the process for using ternary state memories to reduce CRP errors. Referring to FIG. 6, the algorithm for authentication and PUF generation is outlined. Initially, the cryptographic system generates PUF responses by testing areas of the unique pattern that are not blanked by an X. The responses are then stored back in the memory to be prepared to be used for a request for authentication. When the server sends challenges, the full mapping of the CRP pair is reconstructed by bringing back the blanked locations. Following this, the challenges and responses are matched by pair to complete the authentication cycle. As can be noted from FIG. 6, if the authentication is unclear, the process is restarted to flag potential problems with the system, hacking attempts, or hardware malfunctions.

Figure 7:
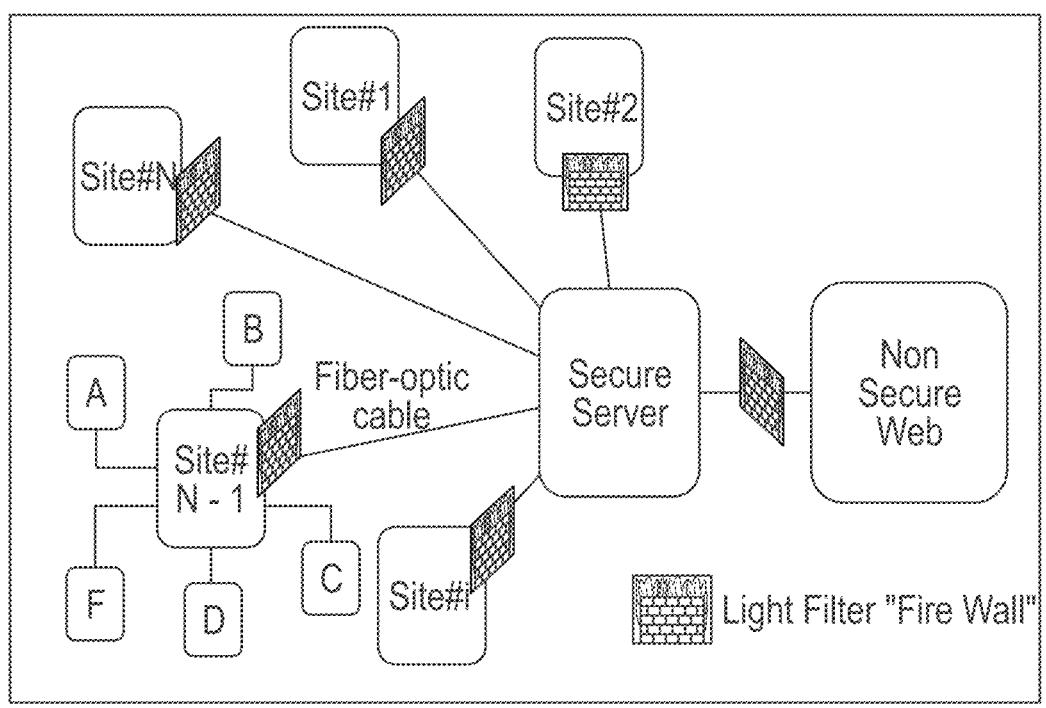
FIG. 7 is a diagram of a telecommunication network secured using a light filter implementations like those according to this disclosure.

Light filters for use in cryptographic operations may be used to create optical "firewalls" that function in some ways like conventional electronic signal firewalls. Referring to FIG. 7, the structure of a system with various optical firewall systems using light filters like those disclosed herein is illustrated. The secure server may have its own firewall to be connected to the non-secure web optical network. Within the optical intranet, the secure server may be connected to each site through a fiber optic cable. For the site N−1, a light filter for use in cryptographic operations has been inserted at the point of entry of the optical cable to create a firewall. The secure server can now recognize the site N−1 as a valid site through validating using the PUF challenge response pairs generated using the light filter allowing the site N−1 to offer services, downloading/uploading of documents, files, digital content, applications, and other communications between the site N−1 and the other sites. At all times, the secure server can verify that the site transmitting information is site N−1 by sending a challenge to authenticate the site before accepting the information. The operating system running the computing system of site N−1 can be programmed to accept running new software and upgrades from the secure server only if these new software products were downloaded from the secure server using the correct PUF challenges. This method may allow the N−1 site from being contaminated with malware on the secure server.

As the foregoing going example illustrates, many different computing systems that utilize optical telecommunications networks may be able to use light filters for use in cryptographic operations like those disclosed herein. Furthermore, it is possible to employ the light filters for use in cryptographic operations even between networks that are not optical, where a transceiver is coupled to the light filter and takes the received electrical signal, converts it to an optical signal. The optical signal then passes through the light filter to generate PUF CRPs, and a transceiver then takes the optical signal and converts it back into an electrical signal. Such systems could be used in fully wired networks that involve no optical transmissions.

A wide variety of microstructures may be used in various system implementation including semitransparent/semitranslucent nanomaterials. In some implementations, the light filter may include nanostructures etched into the material. In others, the microstructures may be created by sputtering, selective deposition, or other deposition techniques. In particular implementations, nanoscale helically oriented structures (nano helix structures) may be employed in various implementations. These structures may be formed in various implementations by using a physical vapor deposition technique called glancing angle deposition (GLAD). FIG. 1 shows examples of various microstructures formed using GLAD techniques. The top left image in FIG. 1 shows a general schematic in which the vapor plume impinges upon the substrate at an oblique angle, a, which leads to a shadowing effect. It is possible to fabricate a wide variety of microstructures with critical dimensions of several micrometers down as small as tens of nanometers. The microstructure arrays can be grown onto a number of surfaces/substrates. However, if a surface of the substrate has raised features, the material growth will occur only on those points. This property of GLAD allows for the controlled growth on patterned surfaces. Further, by depositing onto transparent/translucent substrates, light can be transmitted through the array to measure the optical properties of the materials.

By controlling the deposition rate, substrate orientation, and other deposition parameters, it is possible to control the final morphology of the microstructures on a surface. A number of examples are shown in the electron micrographs of FIG. 1 including nanohelices, barcodes and zigzags made from multiple materials. Another possible microstructure that can be used in various implementations is depositing multiple materials simultaneously to form either nanoalloys or nanocomposites, depending upon the materials evaporated and the deposition conditions. The schematic in the upper right portion of FIG. 1 shows the simultaneous deposition of two materials which are normally immiscible: glass (SiO2) and gold (Au). The formation of nanodots within the electrically insulating backbone of the structures can be controlled by altering the relative ratios between the deposition rates as well as the speed at which each material is deposited.

The sample with the metal nanodots embedded within the insulating nanostructures can be particularly interesting as a nanomaterial for use in light filters for use in cryptographic operations like those disclosed herein. Since the deposition rates are hypothesized to have an influence upon the size and separation between the metal nanodots, the optical properties can be adjusted with the GLAD process. Metal nanoparticles are known to exhibit surface plasmon resonances. The electrons in the metal couple to the electromagnetic wave even though the wavelength of the light may be much larger than the size of the particles themselves. The resonance peak is not only a function of the size and material composition of the nanoparticles, but the separation between particles. The shift in the peak of the absorbance decays exponentially with distance:

$$\frac{\Delta\lambda}{\lambda_0} \approx \alpha\exp\left(-\frac{s/D}{\beta}\right)$$

where $\Delta\lambda/\lambda_0$, s, and D are the fractional plasmon shift, the edge-to-edge separation, and the diameter of the particle, respectively. When the particles are close enough, their collective electron oscillations couple to one another leading to the shift in the plasmon peak.

Composite insulator/metal nanocomposite structures could potentially be very useful for light filters used in cryptographic operations since the spacing between the particles will have a large effect on the light absorbance as a function of wavelength. For example, a red laser may absorb strongly in one section of the substrate due to the plasmonic coupling in that region whereas a second region may give rise to a strong plasmonic shift. This second region would then absorb only a fraction of the light absorbed by the first.

The various microstructures disclosed herein may be produced by using equipment and processes compatible with the micro-electronics industry. Wafers can produce tens of thousands of samples at once, so creating a nanohelical or other nanostructures for light filters described herein may be very cost effective.

Additional examples of microstructures, nanomaterials, nanostructures, and manufacturing techniques that may be employed to make the same are disclosed in the following references, the disclosures of each of which are hereby incorporated entirely herein by reference: K. Robbie and M. Brett, *Journal of Vacuum Science & Technology A* 15, 1460 (1997); Y.-P. Zhao, D.-X. Ye, G.-C. Wang, and T.-M. Lu, *Nano Letters* 2, 351 (2002); J. Gibbs, A. Mark, S. Eslami, and P. Fischer, *Applied Physics Letters* 103, 213101 (2013); A. G. Mark, J. G. Gibbs, T.-C. Lee, and P. Fischer, *Nature Materials* 12, 802 (2013); Shaland Eslami, John Gibbs, Yvonne Rechkemmer, Joris van Slageren, Mariana Alarcon-Correa, Tung-Chung Lee, Andrew G Mark, Geer L J A Rikken, and Peer Fischer; 2014; Chiral Nanomagnets; *ACS Photonics* 2014, 1, 1231-1236; John G Gibbs, Andrew G Mark, Tung-Chun Lee, Sahand Eslami, Debora Schamel, and Peer Fisher; April 2014; Nanohelices by shadow growth; Nanoscale 6, 9457 (2014); J. Homola, S. S. Yee, and G. Gauglitz, *Sensors and Actuators B: Chemical* 54, 3 (1999); C. Sönnichsen and A. P. Alivisatos, *Nano letters* 5, 301 (2005); K.-S. Lee and M. A. El-Sayed, *The Journal of Physical Chemistry B* 110, 19220 (2006); K. A. Willets and R. P. Van Duyne, *Annu. Rev. Phys. Chem.* 58, 267 (2007); J. N. Anker, W. P. Hall, O. Lyandres, N. C. Shah, J. Zhao, and R. P. Van Duyne, *Nature Materials* 7, 442 (2008); and P. K. Jain, W. Huang, and M. A. El-Sayed, *Nano Letters* 7, 2080 (2007).

In places where the description above refers to particular implementations of light filters for use in cryptographic operations and implementing components, sub-components, methods and sub-methods, it should be readily apparent that a number of modifications may be made without departing from the spirit thereof and that these implementations, implementing components, sub-components, methods and sub-methods may be applied to other light filters.

What is claimed is:

1. A light filter for use in cryptographic operations comprising:
    a substrate having at least a first side and a second side, the first side opposing the second side, the substrate comprising one of a translucent, a transparent, a semi-transparent material, and any combination thereof; and
    one or more layers of microscopic structures coupled to of one of the first side, the second side, and both the first side and the second side of the substrate, the microscopic structures each containing one or more structural elements configured to interact with light;
    wherein the microscopic structures are configured to collectively form a unique light pattern on a detector optically coupled with the light filter; and
    wherein the unique pattern is configured to be used to form a challenge-response pair (CRP) and the CRP is configured to be used in cryptographic operations to authenticate an electronic device associated with the light filter.

2. The light filter of claim 1, wherein the microscopic structures are formed by one of subtractive material processing techniques and additive material processing techniques.

3. The light filter of claim 1, wherein the microscopic structures are configured to interact with one of coherent light, polarized light, diffuse light, and any combination thereof.

4. The light filter of claim 1, wherein the electronic device associated with the light filter is electrically coupled with a telecommunication channel and the light filter is used to authenticate the electronic device over the telecommunication channel.

5. The light filter of claim 1, wherein the light filter is optically coupled with a fiber optic cable.

6. The light filter of claim 1, wherein the unique pattern is used to generate a physically unclonable function (PUF) using identified intensities of light by:
    encoding very light intensities as 0, encoding very dark intensities as 1, and encoding intensities between the very light and the very dark as X;
    using the 0 and 1 values to generate a challenge of the CRP; and
    using the 0, 1 values and the X values to generate a response of the CRP.

7. A light filter for use in cryptographic operations comprising:
    a substrate having a first side opposite a second side, the substrate formed of one of a transparent material, a translucent material, a semitransparent material, and any combination thereof; and a coating of microscopic structures on one of the first side, the second side, and both the first side and the second side of the substrate;

wherein the substrate is configured to receive a light on the first side, pass the light through the second side, thereby forming a unique pattern on a detector optically coupled with the light filter, where the unique pattern is generated by the light interacting with the coating of microscopic structures; and wherein the unique pattern is configured to be used in cryptographic operations.

8. The light filter of claim 7, wherein the microscopic structures are formed by one of subtractive material processing techniques and additive material processing techniques.

9. The light filter of claim 7, wherein the light is one of coherent light, polarized light, diffuse light, and any combination thereof.

10. The light filter of claim 7, wherein the unique pattern is used to generate a physically unclonable function (PUF) using identified intensities of light by:

encoding very light intensities as 0, encoding very dark intensities as 1, and encoding intensities between the very light and the very dark as X;

using the 0 and 1 values to generate a challenge of the CRP; and using the 0, 1 values and the X values to generate a response of the CRP.

11. The light filter of claim 7, wherein the cryptographic operations include forming a challenge-response pair (CRP) and the CRP is configured to be used to authenticate an electronic device.

12. The light filter of claim 7, wherein the cryptographic operations include generating random numbers to be used in encoding data transmitted between devices.

* * * * *